US006993331B2

(12) United States Patent
D'herbemont et al.

(10) Patent No.: US 6,993,331 B2
(45) Date of Patent: Jan. 31, 2006

(54) MOBILE TELECOMMUNICATIONS SYSTEM THAT IS ROBUST WITH RESPECT TO RADIO NETWORK CONTROLLER FAILURES

(75) Inventors: Luc D'herbemont, Paris (FR); Thierry Garcin, Paris (FR); Francois Gouere, Jouars Pontchartrain (FR); Michael Roberts, Neuilly sur Seine (FR)

(73) Assignee: Lucent Technologies Inc., Murray Hill, NJ (US)

( * ) Notice: Subject to any disclaimer, the term of this patent is extended or adjusted under 35 U.S.C. 154(b) by 571 days.

(21) Appl. No.: 10/075,877

(22) Filed: Feb. 13, 2002

(65) Prior Publication Data

US 2002/0115438 A1 Aug. 22, 2002

(30) Foreign Application Priority Data

Feb. 16, 2001 (EP) ................................. 01301341

(51) Int. Cl.
*H04Q 7/20* (2006.01)
*H04M 11/00* (2006.01)
*H04B 7/00* (2006.01)

(52) U.S. Cl. .................. 455/435.1; 455/421; 455/423; 455/435.2; 455/525

(58) Field of Classification Search ............ 455/435.1, 455/435.2, 421, 423, 525
See application file for complete search history.

(56) References Cited

U.S. PATENT DOCUMENTS 6,157,633 A * 12/2000 Wright ....................... 370/349
6,411,816 B1 * 6/2002 McDonald et al. ......... 455/518
2001/0046839 A1 * 11/2001 Latva-Aho et al. ........ 455/3.05

FOREIGN PATENT DOCUMENTS

WO WO 00/60823 10/2000
WO WO 00/60823 A3 10/2000

OTHER PUBLICATIONS

XP 002176718, Unerversal Mobile CommunicationsSystem, ETSI, Dec. 1, 2000.

* cited by examiner

*Primary Examiner*—William Trost
*Assistant Examiner*—Wesley Kim

(57) ABSTRACT

The present invention relates to a UMTS (Universal Mobile Telephone System) type system of mobile radio telecommunications that is robust with respect to radio network controller failures: According to the invention, following a temporary interruption in operation of a radio network controller of the UTRAN network of the system and after the reinitialization of this radio network controller, the UTRAN network sends a piece of information to all the cells controlled by the reinitialized radio network controller or by its neighboring radio network controllers. This piece of information prompts the user equipment devices that are in these cells to make their presence known to the UTRAN network. According to the invention, the user equipment devices in connected mode are capable of processing said piece of information.

8 Claims, 3 Drawing Sheets

MOBILE TELECOMMUNICATIONS SYSTEM THAT IS ROBUST WITH RESPECT TO RADIO NETWORK CONTROLLER FAILURES

BACKGROUND OF THE INVENTION

I. Field of the Invention

The present invention relates to a UMTS (Universal Mobile Telephone System) type of mobile radio telecommunications system that is robust with respect to radio network controller failures.

II. Description of the Related Art

A UMTS type system consists of a UTRAN (Universal Terrestrial Radio Access Network) type of network, mobile terminals commonly known as user equipment (UE) devices, and a core network linked with the public switched telephone network and the Internet network. A system of this kind is illustrated in FIG. 1. The UTRAN network consists of a set of radio network sub-systems RNS connected to the core network by means of an interface Iu. Each radio network sub-system RNS consists of a radio network controller RNC controlling a set of logic elements, known as Node B, by means of an interface Iub. The radio network controllers RNC are connected to each other by an interface Iur. Each Node B serves one or more cells of the network. Cells may be grouped in areas known as UTRAN registration areas (URA). A URA generally brings together the cells arranged along a given path that is generally very much used, for example the cells along a motorway. Finally, each user equipment device UE is connected to one or more Node Bs through a radio interface Uu.

In the example of FIG. 1, the UTRAN network comprises three radio network controllers referenced RNC1, RNC2, and RNC3 and each of these radio network controllers controls two Node Bs. Four user equipment devices UE1, UE2, UE3 and UE4 are connected to these Node Bs.

The user equipment devices have two modes of operation: an idle mode and a connected mode. During the idle mode, no system resource is specifically allocated for the conveyance of data to and from the user equipment device. The user equipment device is in idle mode for example after it is powered on. In this mode, each user equipment device is identified by a core network identity which may be either the IMSI (International Mobile Subscriber Identity) of the user equipment device (which is transmitted to the core network during the first connection of the user equipment device to the UMTS system) or a TMSI (Temporary Mobile Subscriber Identity) for a circuit switch service or a PTMSI (Packet Temporary Mobile Subscriber Identity) for a packet switch service.

The user equipment device passes into connected mode when there is a request for making a connection to the system. Thus, as soon as information has to be transmitted to a user equipment device in idle mode, the core network uses the UTRAN network to send a paging message to the user equipment device concerned to ask it to pass into connected mode.

In connected mode, the user equipment device may take four states known as mobility states:

Cell_DCH for Cell Dedicated Channel;

Cell_FACH for Cell Forward Access Channel;

URA_PCH for UTRAN Registration Area Paging Channel;

Cell_PCH for Cell Paging Channel.

These four mobility states are described in detail in the radio access network group technical specification "3GPP TS 25.331 V3.5.0", section 7, pages 30–32 and Appendix B, pages 615–622, updated in December 2000.

In brief, in the four mobility states of the connected mode, system resources are allocated for the transmission of data in the uplink and/or downlink. These radio resources may or may not be shared among several user equipment devices.

In connected mode, the user equipment devices are identified by a URNTI (UTRAN Radio Network Temporary Identity) allocated by one of the Serving Radio Network Controllers (SRNC). The URNTI of a user equipment device contains the identity of the serving radio network controller associated with it. The serving radio network controller of a user equipment device in connected mode corresponds to the radio network controller that is linked with the core network for the connection considered. For example, if we consider in FIG. 1 that the user equipment device UE3 transmits data to the core network by passing first of all through the radio network controller RNC2 and then through the radio network controller RNC1, the latter is the serving radio network controller associated with the user equipment device UE3.

In the event of the failure of one of the radio network controllers leading to a break in the connections Iu between this radio network controller and the core network and the loss of all or part of the data pertaining to the user equipment device, for example the URNTIs, all the user equipment devices having this radio network controller as the serving radio network controller are perceived by the core network as being in the idle mode. It must be noted that, when the defective radio network controller starts working properly again, it also perceives all the user equipment devices as being in idle mode. Once the defective radio network controller works properly again, if the core network tries to set up a connection with these user equipment devices to send them data, the radio network controller will try to establish a connection using their core network identity. Since the user equipment devices are in connected mode, they will be unaware of these attempts to make connection. All these user equipment devices are therefore inaccessible until they themselves make their presence known to the network for example by an updating operation. This period of non-accessibility of the user equipment device may be very lengthy and may last several hours.

At present, the only solution to this problem lies in sending paging messages by testing all the URNTIs possible in order to connect with all the user equipment devices in connected mode having one of these identities and ask them to make their presence known to the network. This approach is not very satisfactory because it is very costly in terms of system resources (in paging channel PCH) and in time. Indeed, there may be more than 100,000 user equipment devices connected to each radio network controller.

SUMMARY OF THE INVENTION

Thus, it is an aim of the invention to find an approach to limit this period of non-accessibility of user equipment devices to the utmost possible extent.

An object of the invention therefore is a system of mobile radio telecommunications comprising a core network, a UTRAN network and a plurality of user equipment devices, said UTRAN network comprising radio network controllers each controlling one or more coverage areas called cells in which the user equipment devices move about, each user equipment device being capable of working selectively in two modes of operation, a connected mode in which resources of the system are assigned to the setting up of a connection with the user equipment device and an idle mode characterized in that, following a temporary interruption in operation of a radio network controller of the UTRAN network and a reinitialization of this radio network controller, the UTRAN network sends a piece of information to all the cells controlled by the reinitialized radio network controller or by its neighbouring radio network controllers, this piece of information prompting the user equipment devices that are in these cells to make their presence known to the UTRAN network, and in that said user equipment devices in connected mode are capable of processing said piece of information. This information is for example transmitted through a broadcast channel.

In a first embodiment, the information sent is a modified value, $T_{new}$, of the periodic cell update or the periodic URA update timer. This information is broadcast by the broadcast channel. Each user equipment device in connected mode then makes its presence known to the UTRAN network at the end of a random period of time $t_{update}$ smaller than $T_{new}$.

In a second embodiment, the transmitted information consists of a flag indicating that one of the radio network controllers of the UTRAN network has been reinitialized and a maximum time value $t_{max}$ assigned to the user equipment devices to make their presence known to the UTRAN network. In this embodiment, the user equipment devices also make their presence known to the UTRAN network at the end of a random period of time $t_{update}$ smaller than $t_{max}$.

Advantageously, the flag comprises the identity RNC-ID of the reinitialized radio network controller. In this case, only the user equipment devices for which the UTRAN radio network temporary identity contains the identity RNC-ID make their presence known to the UTRAN network.

BRIEF DESCRIPTION OF THE DRAWINGS

The characteristics and advantages of the invention shall appear more clearly from the following detailed description which is made with reference to the appended drawings, of which.

DETAILED DESCRIPTION

According to the invention, in the event of a temporary interruption of the operation of one of the radio network controllers and after the reinitialization of this radio network controller, the UTRAN network sends a piece of information to all the cells controlled by this radio network controller and all the cells controlled by its neighbours. This piece of information prompts the user equipment devices that are located in these cells to make their presence known to the UTRAN network. According to the invention, the user equipment devices in connected mode are also capable of processing this piece of information.

This piece of information is for example transmitted through a broadcast channel.

Figure 1:
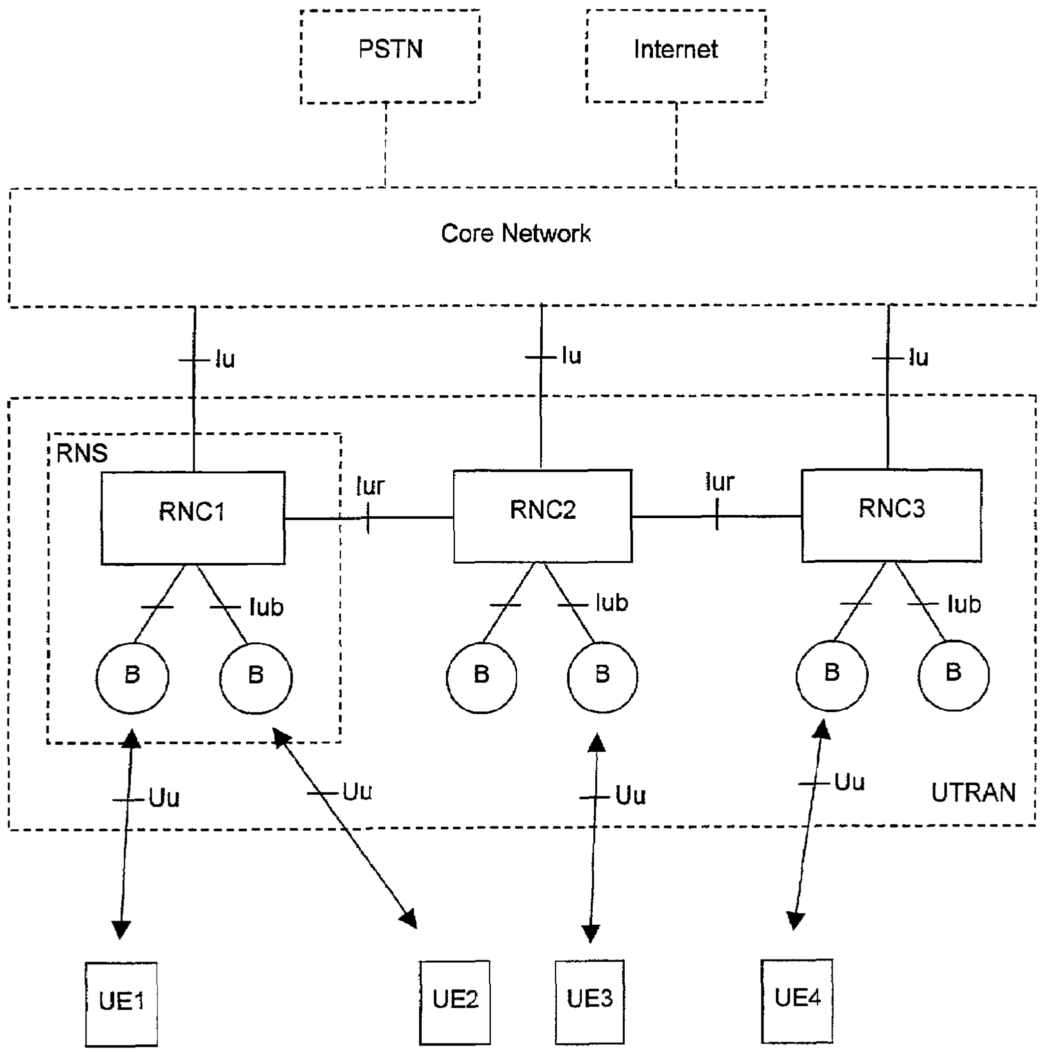
FIG. 1, which has already been described, shows the standard architecture of a UMTS system.
Figure 2:
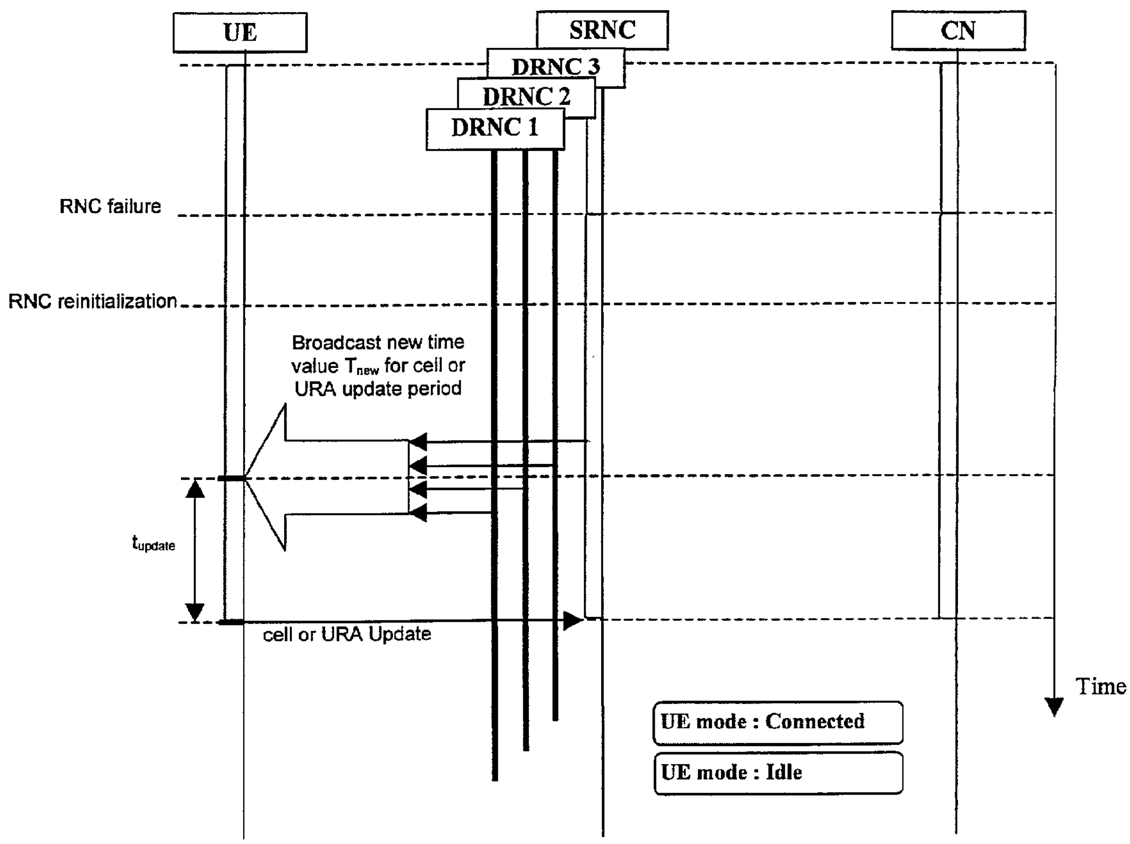
FIG. 2 illustrates a first embodiment of the system according to the invention.

In a first embodiment illustrated by FIG. 2, the information sent is a modified value $T_{new}$ of the updating period of the cells broadcast by the broadcast channel. It may be recalled that it may be asked to a user equipment device to regularly send a message to the UTRAN network at intervals T given by the broadcast channel of the cell in which it is located.

The duration of these intervals may be in the range of some hours. This means that the user equipment device may remain inaccessible for several hours if the associated serving radio network controller has suffered a failure just after the last update message sent by the user equipment device. Therefore, according to the invention, a new period value $T_{new}$, smaller than T, for example $T_{new}$=15 minutes, is sent through the broadcast channel so that the user equipment devices can very quickly make their presence known to the UTRAN network.

So that all the user equipment devices in connected mode will not make their presence known at the same time to the UTRAN network, each user equipment device in connected mode will preferably respond at the end of a random period of time $t_{update}$ smaller than $T_{new}$.

FIG. 2 considers a user equipment device UE in connected mode. Said user equipment device is connected to a radio network controller which is either its serving radio network controller SRNC or a radio network controller neighbouring this controller SRNC, referenced DRNC1, DRNC2 or DRNC3. The radio network controllers that are neighbours of SRNC are also called drift radio network controllers. These drift radio network controllers designate the radio controllers by which a connection can be routed in order to reach the serving radio network controller SNRC. The drift radio network controllers communicate with the serving radio network controller or between them through the interface Iur.

According to the invention, the new value $T_{new}$ is broadcast in the cells controlled by the radio network controllers SNRC, DRNC1, DRNC2 or DRNC3. In response, all the user equipment devices in connected mode that are in the cells send an update message. Each user equipment device randomly determines a period of time $t_{update}$ smaller than $T_{new}$ at the end of which the update message is sent.

After reception of the update message coming from the user equipment device UE, the network UTRAN detects the fact that the equipment UE is in connected mode. Should all or part of the parameters of the connection set up between the user equipment device UE and the core network be lost, the network UTRAN may ask the user equipment device UE to go back into idle mode.

Figure 3:
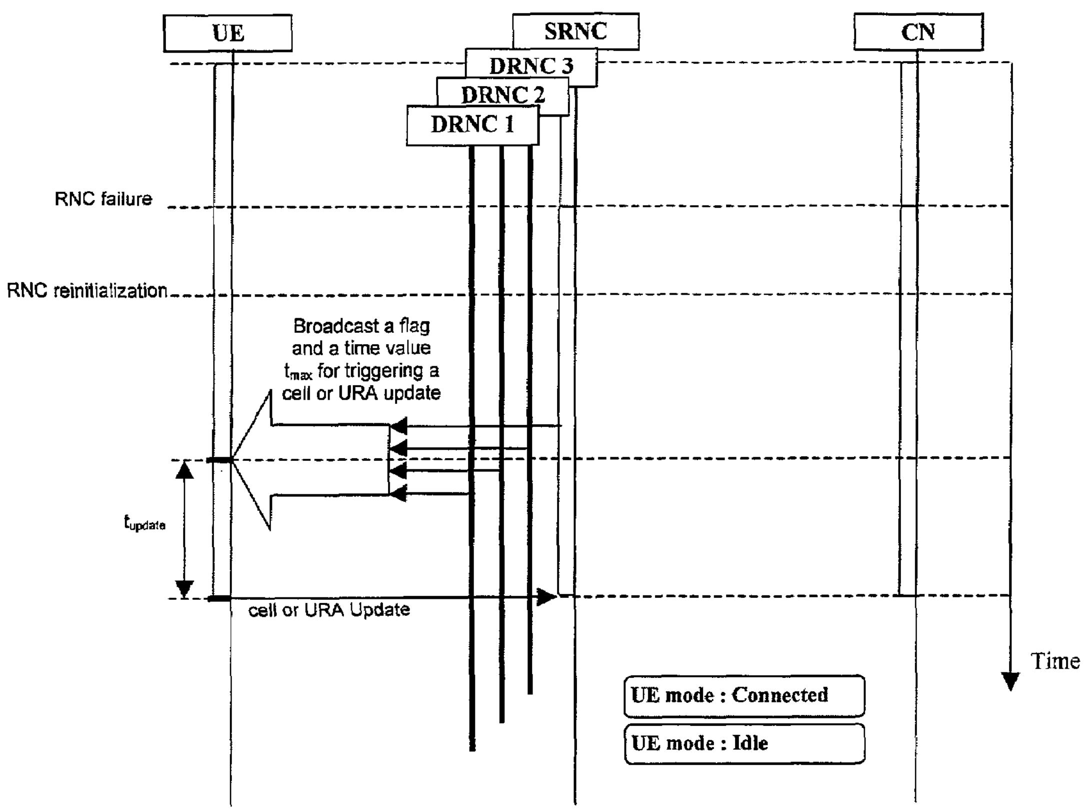
FIG. 3 illustrates a second embodiment of the system according to the invention.

According to another embodiment illustrated by FIG. 3, the network UTRAN, after the reinitialization of the radio network controller SRNC, sends a flag into the cells controlled by the radio network controllers SNRC, DRCN1, DRNC2 and DRNC3, indicating that the radio network controller SNRC has been reinitialized, and a time value $t_{max}$ attributed to the user equipment devices to send an update message. In response, all the user equipment devices in connected mode, that are located in the cells send an update message at the end of a random period of time $t_{update}$ proper to each of the user equipment devices and smaller than $t_{max}$. The value $t_{update}$ is proper to each user equipment device.

Advantageously, the flag comprises the identity of the radio network controller that has suffered failure and has been reinitialized. Since the URNTI of the user equipment device UE contains the identity of its serving radio network controller RNC-ID, the user equipment device UE can ascertain that the radio network controller which has suffered failure is its serving radio access network. If this is the case, the user equipment device sends an update message to the UTRAN network at the end of a period of time $t_{update}$. If this is not the case, it does not have to send any update message and resumes normal operation as if no flag had been received. This variant limits the number of update messages sent following the reinitialization of a radio network controller.

What is claimed is:

1. A system of mobile radio telecommunications comprising a core network, a UTRAN network and a plurality of user equipment devices, said UTRAN network comprising radio network controllers, each controlling one or more coverage areas called cells in which the user equipment devices move about, each user equipment device being capable of working selectively in two modes of operation, a connected mode in which resources of the system are assigned to the setting up of a connection with the user equipment device and an idle mode wherein, following a temporary interruption in operation of a radio network controller of the UTRAN network and a reinitialization of this radio network controller, the UTRAN network sends a piece of information to the cells controlled by the reinitialized radio network controller or by its neighbouring radio network controllers, this piece of information prompting the user equipment devices that are in these cells to make their presence known to the UTRAN network, and in that said user equipment devices in connected mode are capable of processing said piece of information, wherein the transmitted information consists of a flag indicating that one of the radio network controllers of the UTRAN network has been reinitialized and a maximum time value $t_{max}$ assigned to the user equipment devices to make their presence known to the UTRAN network, and wherein the flag comprises the identity RNC-ID of the radio network controller whose operation has been reinitialized and in that only the user equipment devices for which the UTRAN radio network temporary identity contains the identity RNC-ID make their presence known to the UTRAN network.

2. The system according to claim 1, wherein said information is transmitted through a broadcast channel.

3. The system according to claim 2, wherein the transmitted information is a modified value, $T_{new}$, of the periodic cell update or the periodic URA update timer broadcast by the broadcast channel.

4. The system according to claim 3, wherein each user equipment device makes its presence known to the UTRAN network at the end of a random period of time $t_{update}$ smaller than $T_{new}$.

5. The system according to claim 1, wherein each user equipment device makes its presence known to the UTRAN network at the end of a random period of time $t_{update}$ smaller than $t_{max}$.

6. A system of mobile radio telecommunications comprising a UTRAN network, said UTRAN network comprising radio network controllers, each controlling one or more coverage areas called cells in which user equipment devices move about, wherein, following a temporary interruption in operation of a radio network controller of the UTRAN network and a reinitialization of this radio network controller, the UTRAN network sends a piece of information to the cells controlled by the reinitialized radio network controller or by its neighbouring radio network controllers, this piece of information prompting the user equipment devices that are in these cells to make their presence known to the UTRAN network, wherein the transmitted information consists of a flag indicating that one of the radio network controllers of the UTRAN network has been reinitialized, and wherein the flag comprises the identity RNC-ID of the radio network controller whose operation has been reinitialized so that only the user equipment devices for which the UTRAN radio network temporary identity contains the identity RNC-ID make their presence known to the UTRAN network.

7. The system according to claim 6, wherein said information is transmitted through a broadcast channel.

8. The system according to claim 7, wherein the transmitted information is a modified value, $T_{new}$ of the periodic cell update or the periodic URA update timer broadcast by the broadcast channel.

* * * * *